(12) United States Patent
Fenkanyn

(10) Patent No.: US 8,157,172 B2
(45) Date of Patent: Apr. 17, 2012

(54) RFID TAG PACKAGE AND TIRE ASSEMBLY

(75) Inventor: John Michael Fenkanyn, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 786 days.

(21) Appl. No.: 12/261,161

(22) Filed: Oct. 30, 2008

(65) Prior Publication Data

US 2010/0108211 A1    May 6, 2010

(51) Int. Cl.
*G06K 7/08* (2006.01)
(52) U.S. Cl. ...... 235/451; 235/492; 235/487; 152/152.1
(58) Field of Classification Search ........... 235/451, 235/441, 492, 487, 375; 340/442, 447, 572.8; 152/152.1
See application file for complete search history.

(56) References Cited

U.S. PATENT DOCUMENTS

| | | | |
|---|---|---|---|
| 5,573,611 A | 11/1996 | Koch et al. | 152/152.1 |
| 5,971,046 A | 10/1999 | Koch et al. | 152/152.1 |
| 6,244,104 B1 | 6/2001 | Koch et al. | 73/146 |
| 6,309,494 B1 | 10/2001 | Koch et al. | 156/153 |
| 6,388,567 B1 | 5/2002 | Bohm et al. | 340/442 |
| 6,443,198 B1 | 9/2002 | Koch et al. | 152/152.1 |
| 6,444,069 B1 | 9/2002 | Koch et al. | 156/123 |
| 6,474,380 B1 | 11/2002 | Rensel et al. | 152/152.1 |
| 6,477,894 B1 | 11/2002 | Koch et al. | 73/146 |
| 6,524,415 B1 | 2/2003 | Youngman et al. | 156/123 |
| 6,546,982 B1 | 4/2003 | Brown et al. | 152/152.1 |
| 6,653,936 B2 | 11/2003 | Bohm et al. | 340/442 |
| 6,668,884 B2 | 12/2003 | Koch et al. | 152/152.1 |
| 6,688,353 B1 | 2/2004 | Koch | 152/152.1 |
| 6,705,365 B1 | 3/2004 | Wilson | 152/152.1 |
| 6,788,192 B2 | 9/2004 | Shimura | 340/447 |
| 6,798,140 B2 | 9/2004 | Reim et al. | 315/76 |
| 6,860,303 B2 | 3/2005 | Rensel et al. | 152/152.1 |

(Continued)

FOREIGN PATENT DOCUMENTS

EP       505905       9/1992

(Continued)

OTHER PUBLICATIONS

European Search Report completed Jan. 26, 2010.

*Primary Examiner* — Edwyn Labaze
(74) *Attorney, Agent, or Firm* — Richard B. O'Planick

(57) ABSTRACT

A tire and RFID tag combine as an assembly to include a tire and a tag package mounted to a tire tag mounting surface. The tag package includes a carrier substrate having a die receiving surface and one or more interconnection tabs mounted to the die receiving surface. The tag package further includes a dipole antenna or other antenna configuration formed by first and second antenna members having inward ends connected to respective first and second interconnection tabs on the die receiving surface and outer antenna segments extending outward from the carrier substrate. An integrated circuit die mounts to the die receiving surface and has electrical contact(s) in contacting engagement with the interconnection tab(s). A cap member or, alternatively, a cylindrical encapsulating member, may be utilized for enclosing the integrated circuit die, the carrier substrate, and the inward ends of the first and second antenna members; the outer antenna segments of the first and second antenna members extending outward from the cap member or encapsulating member in operable position against respective portions of the tire tag mounting surface.

8 Claims, 8 Drawing Sheets

U.S. PATENT DOCUMENTS

| | | | | |
|---|---|---|---|---|
| 6,885,291 | B1 | 4/2005 | Pollack et al. | 340/445 |
| 8,025,238 | B2 * | 9/2011 | Jung et al. | 235/492 |
| 2004/0017291 | A1 | 1/2004 | Hardman et al. | 340/505 |
| 2004/0094251 | A1 | 5/2004 | Strache et al. | 152/152.1 |
| 2004/0134578 | A1 | 7/2004 | Kleckner et al. | 152/152.1 |
| 2004/0140030 | A1 | 7/2004 | Hahn et al. | 152/152.1 |
| 2004/0159383 | A1 * | 8/2004 | Adamson et al. | 152/152.1 |
| 2004/0182494 | A1 * | 9/2004 | Dominak et al. | 156/110.1 |
| 2005/0059308 | A1 | 3/2005 | Parsons et al. | 442/149 |
| 2005/0076982 | A1 | 4/2005 | Metcalf et al. | 152/152.1 |
| 2005/0076992 | A1 | 4/2005 | Metcalf et al. | 156/110.1 |
| 2005/0093761 | A1 * | 5/2005 | King et al. | 343/873 |
| 2006/0097870 | A1 * | 5/2006 | Choi et al. | 340/572.1 |
| 2007/0229261 | A1 * | 10/2007 | Zimmerman et al. | 340/572.1 |

FOREIGN PATENT DOCUMENTS

| | | |
|---|---|---|
| EP | 1870262 | 12/2007 |
| EP | 1942445 | 7/2008 |

* cited by examiner

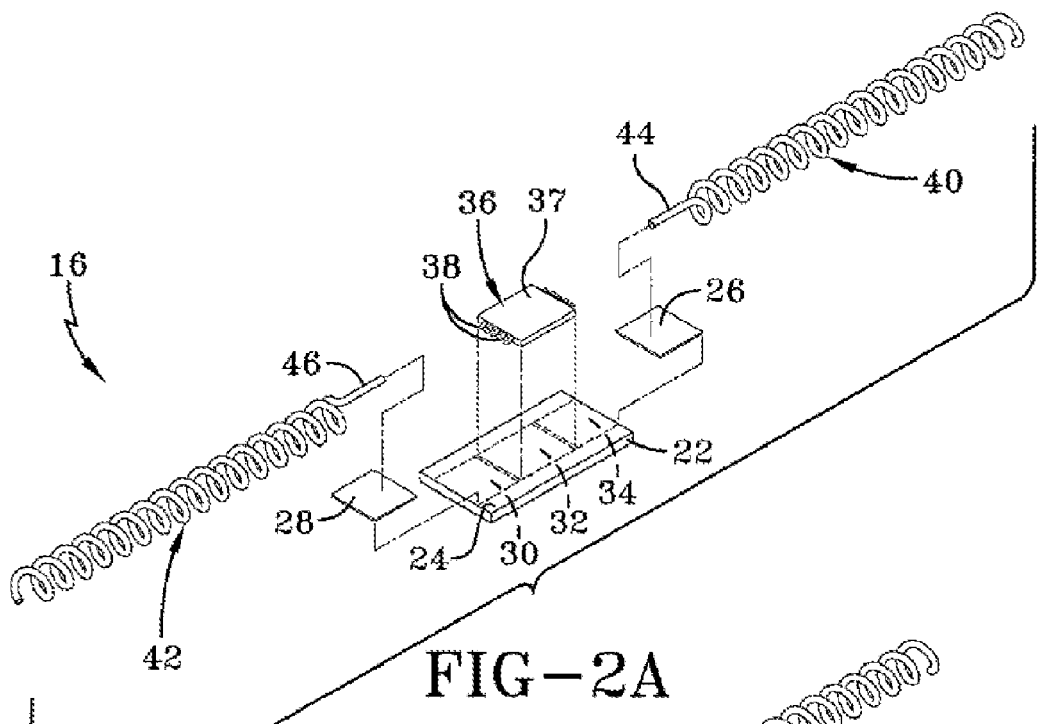
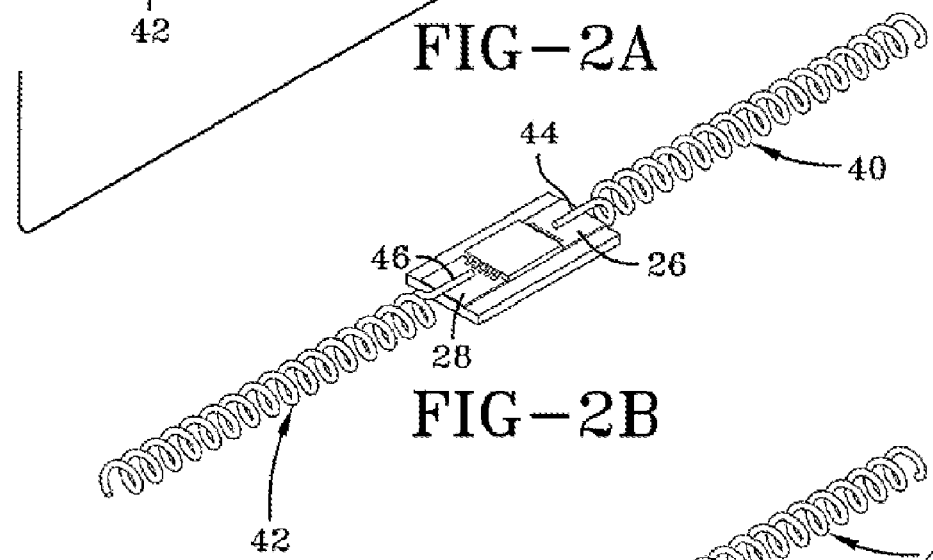
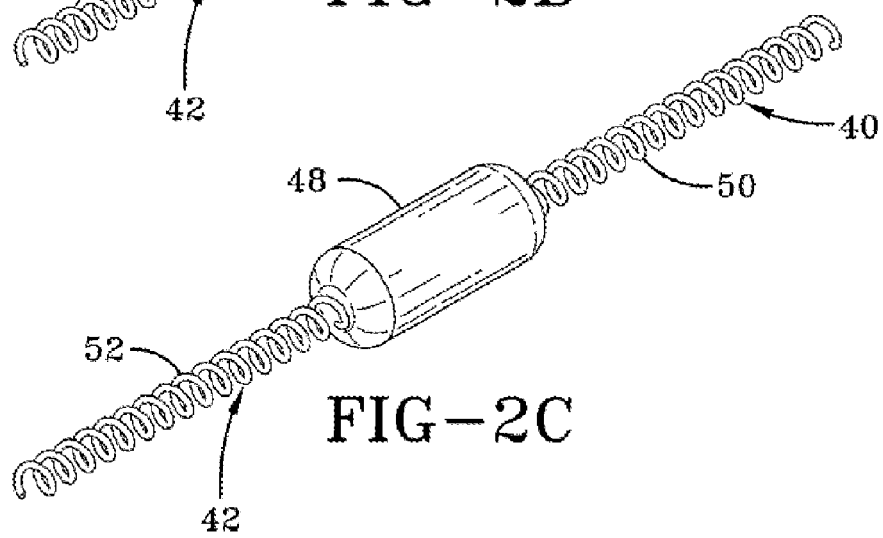

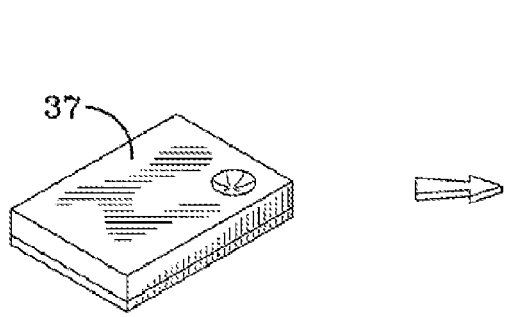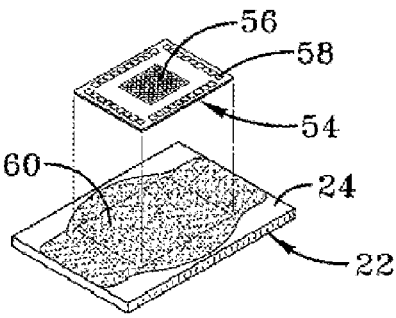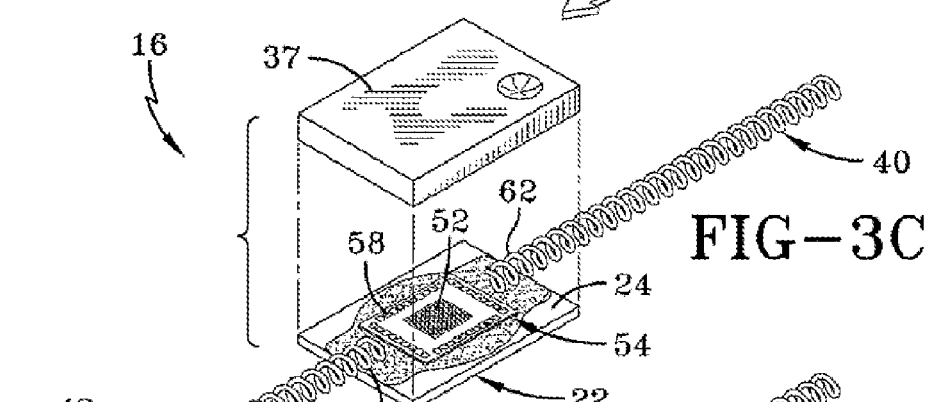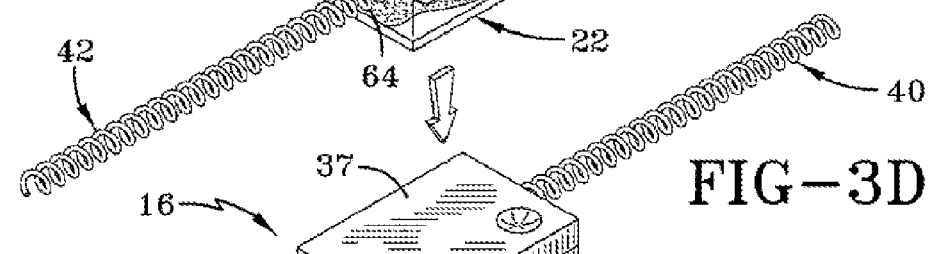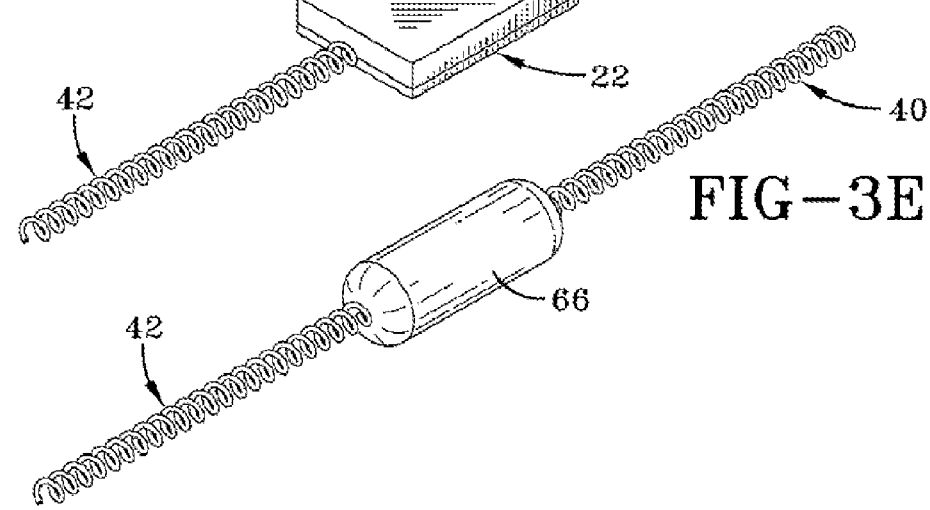

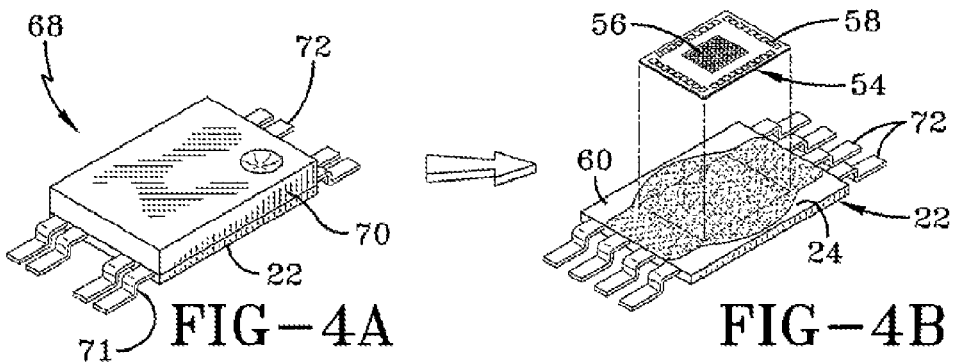
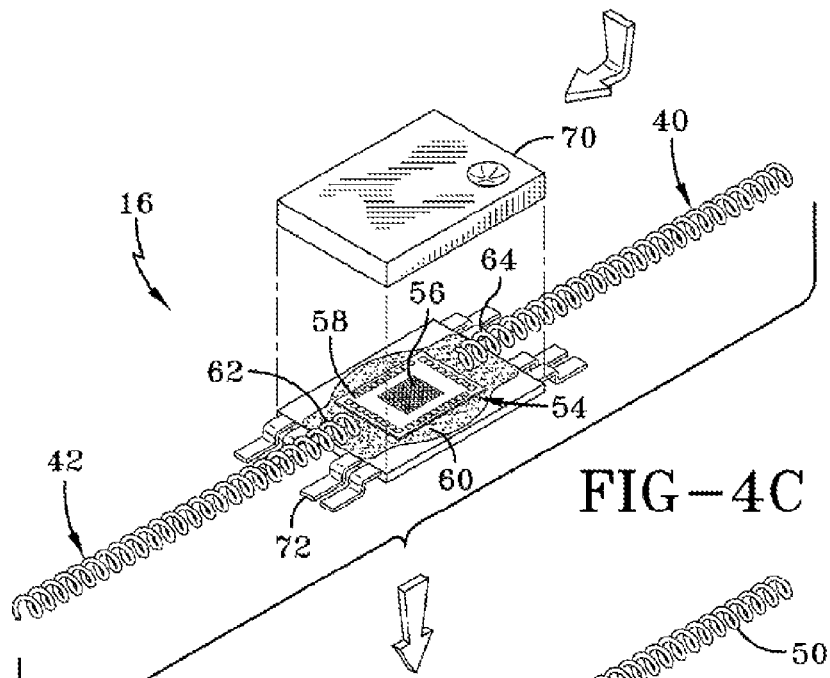
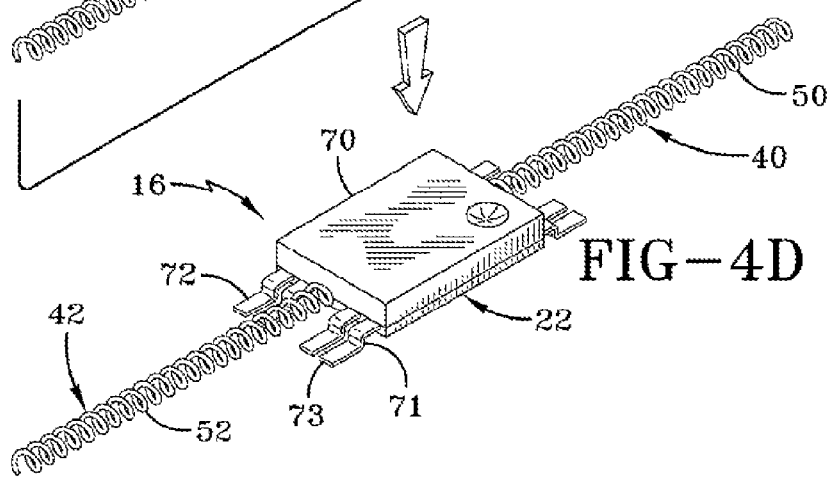

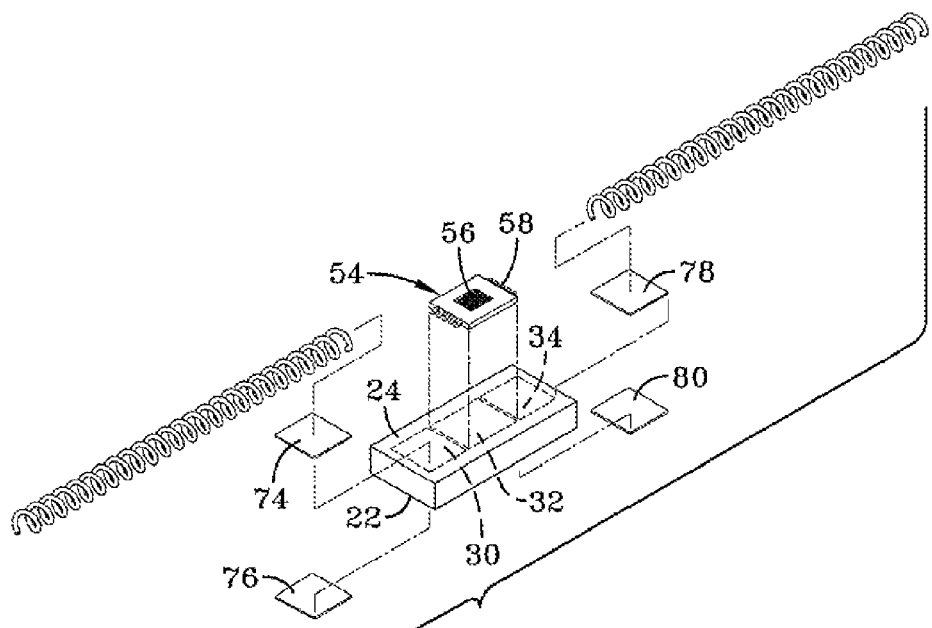
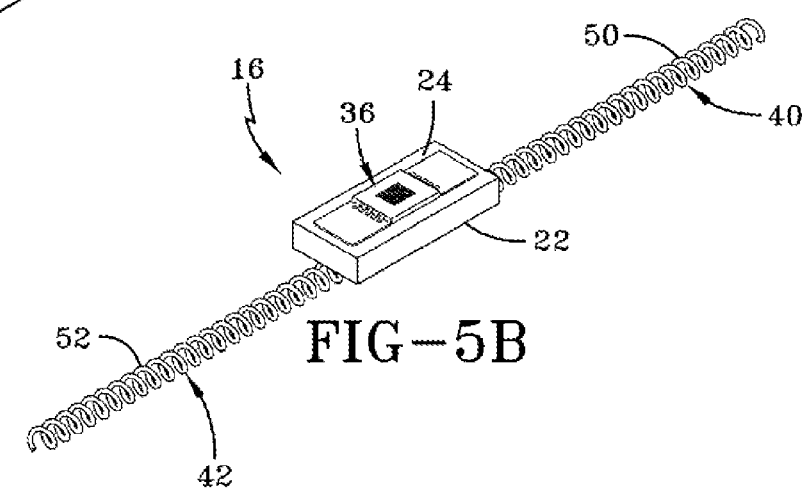

RFID TAG PACKAGE AND TIRE ASSEMBLY

FIELD OF THE INVENTION

The invention relates generally to a highly durable RFID tag package and, more particularly, to a tire and RFID tag assembly incorporating a highly durable RFID tag package.

BACKGROUND OF THE INVENTION

Incorporation of an RFID tag into a tire can occur during tire construction and before vulcanization or in a post-cure procedure. Such tags have utility in transmitting tire-specific identification data to an external reader. UHF (ultra-high frequency) tags are typically small and utilize flexible antennas for the transmission of data. In commercially available RFID devices, the antennas are connected to solder leads of a circuit board onto which the device's integrated circuit board is mounted. When embedded into a tire, such as during within a tire sidewall during the tire construction, the device is subjected to the stress endemic to tire operation and performance. Such forces may act to cause failure of the RFID tag or failure in the mechanical and electrical connections between end of the antenna and the circuit board solder leads. Failure of the RFID tag in any form is undesirable and it is important that the RFID package be capable of ensuring the mechanical and electrical integrity of the tag antenna and the electronic circuit board throughout the tire life cycle. Accordingly, there remains a need for a UHF RFID tag package that is readily incorporated into a tire; provides the requisite durability to maintain antenna to circuit board integrity during the life of the tire and the service life of the tag.

SUMMARY OF THE INVENTION

According to an aspect of the invention, a tire and RFID tag combine as an assembly including a tire having a tag mounting surface and a tag package mounted to the tag mounting surface. The tag package may include a carrier substrate having a die receiving surface and at least one interconnection tab mounted to the die receiving surface and composed of electrically conductive material. The tag package further includes an antenna having an end connected to the interconnection tab on the die receiving surface and an antenna segment extending outward from the carrier substrate. The tag package further includes an integrated circuit die mounted to the die receiving surface and having at least one electrical contact in contacting engagement with the interconnection tab.

Pursuant to another aspect of the invention, the antenna is a dipole antenna (but may be other known antenna configurations) formed by first and second antenna members having inward ends connected to respective first and second interconnection tabs on the die receiving surface and outer antenna segments extending outward from the carrier substrate. The integrated circuit die provides electrical contacts in contacting engagement with the first and second interconnection tabs.

In a further aspect of the invention, a cap member or, alternatively, a cylindrical encapsulating member, may be utilized for enclosing the integrated circuit die, the carrier substrate, and the inward ends of the first and second antenna members; the outer antenna segments of the first and second antenna members extending outward from the cap member or encapsulating member in operable position against respective portions of the tire tag mounting surface.

Definitions

"Aspect ratio" of the tire means the ratio of its section height (SH) to its section width (SW) multiplied by 100% for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Camber angle" means the angular tilt of the front wheels of a vehicle. Outwards at the top from perpendicular is positive camber; inwards at the top is negative camber.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Slip angle" means the angle of deviation between the plane of rotation and the direction of travel of a tire.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 2A is an exploded assembly view of a RFID tag.

FIG. 2B is an assembled view of the RFID tag package of FIG. 2A shown prior to application of an outer coating.

FIG. 2C is an assembled view of the finished RFID cylindrical tag package.

FIGS. 3A, 3B, 3C, and 3D are sequential perspective views of a first assembly sequence of the RFID tag package.

FIG. 3E is an tubular packaged tag.

FIGS. 4A, 4B, 4C, and 4D are sequential perspective views of a second assembly sequence of the RFID tag package.

FIGS. 5A, 5B, 5C, and 5D show an alternative through bore connection between a tag and antenna elements.

DETAILED DESCRIPTION OF THE INVENTION

Figure 1:
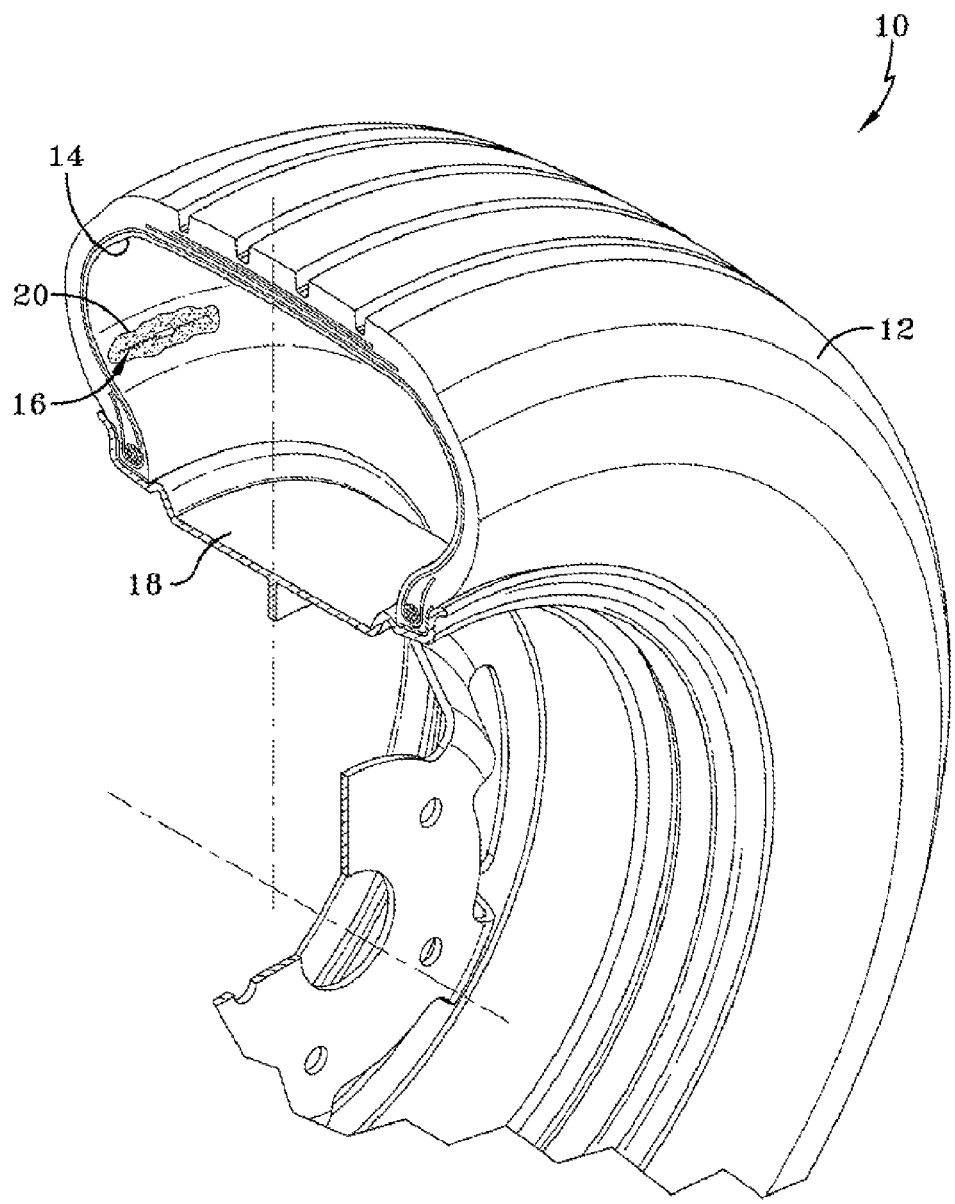
FIG. 1 is a break-away view of a tire with a RFID tag mounted or embedded onto the tire inner sidewall.

Referring first to FIGS. 1, 2A-C, an electronic tire tag 16 is of a conventional commercially configured type and includes an antenna formed by a pair of coiled antenna segments 40, 42. An integrated circuit package (IC) 6 is mounted to a carrier substrate 22 and includes interconnection leads 38 extending from opposite IC package sides respectively. The antenna 40, 42 is electrically connected to the IC leads 38 and is suitably tuned to a predetermined radio frequency "f" for receiving RF signals, referred to herein as interrogation signals, from an external transceiver (not shown).

Operatively, the interrogation signal is received by the antenna 40, 42 from a remote transponder (not shown) and transmitted to the integrated circuitry within the package 36. The integrated circuit within the package 36 processes the RF interrogation signal into a power signal for powering a logic circuit that includes conventional ROM, RAM, or other known types of memory storage devices and circuitry. Data transmission from the storage devices is thereby enabled and stored data is transmitted by the antenna 40, 42 back to an external reader or transponder (not shown). The tag 16 may be incorporated within various products and utilized to communicate stored data relating to such products to the remote reading device.

The electronic tire tag 16 is preferably wrapped with a suitable green rubber material (not shown) to form a green rubber patch (not shown) that is vulcanized and fixedly secured to a tire (not shown). Alternatively, the tag 16 may be incorporated within the green tire prior to tire cure.

Referring initially to FIGS. 1, 2A-C collectively, a tag and tire assembly 10 is shown. A conventionally configured tire 12 includes an inner lining 14 to which a RFID tag assembly 16 is incorporated. In the embodiment shown, without any intent to limit the invention, the RFID tag assembly 16 is attached to the inner lining 14 (but may also be embedded in any layer of the sidewall) by a suitable commercial grade adhesive 20. Other locations or tire components may be utilized if desired without departing from the invention. The tire 12 with the tag assembly 16 incorporated therein is mounted conventionally to a rim 18.

The RFID assembly 16 includes a carrier substrate 22 having a top support surface 24 on which a pair of spaced apart conductive contact pads 26, 28 are mounted. In general, the support surface 24 includes spaced apart contact pad receiving locations 30, 34 separated by a medial RFID device receiving location 32 between locations 30, 34. An RFID electronic package 36 encased within a cover 37 is mounted to the support surface 24 at the medial location 32 as shown in FIG. 2A. Attachment may be by any suitable means such as adhesive. The package 36 includes an array of contact legs 38 along opposite sides. In its intended location at location 32, the contact legs 38 will establish electrical and mechanical contact with the contact pads 26, 28 on support surface 24.

The RFID tag assembly 16 further includes a dipole antenna (but can be other antenna types) comprised of coiled antenna segments 40, 42. The antenna segments 40, 42 have a respective inward end 44, 46 that is coupled to the contact pads 44, 46 by suitable means such as solder. While the ends 44, 46 are shown as straightened portions of the coiled segments 40, 42, the ends may be in a coiled configuration if so desired. The tag assembly 16 of FIG. 2B may be incorporated into a tire as shown in FIG. 1 by adhesive application 20 or other suitable means. So located, the antenna segments 40, 42, and the substrate 22 will be supported by mounting surface portions of the tire inner liner 14. Stresses introduced into the tire and acting upon the assembly 16 will be accommodated by flexure of the segments 40, 42 that extend from the substrate 22. The tag assembly 16 is thus durable and capable of withstanding the highly stressed environment of a tire cavity.

In order to make the assembly 16 even more durable, an encapsulating casing 48 may be secured to encase the substrate, the RFID package 36 and the inward ends 44, 46 of the antenna segments 40, 42 as shown in FIG. 2C. The casing 48 may be formed of plastics or other suitable material. The casing 48 is preferably of tubular form as shown. The tubular form of the casing 48 will protect the electronic components and connections therein from potentially damaging contact with foreign objects and the stresses acting on the assembly 16 from the tire and tire operation, as well as in shipping and handling of the assembly 16 prior to and during incorporation into a tire.

In FIGS. 3A-3D an opened or already opened IC package is shown. The connections made to the leads of the package were made to the antenna instead. The RFID die 54 is removed from an IC package and replaced. The die connections are made directly to the antenna segment ends 44, 46. The die 44 is mounted directly to the substrate support surface 24. The die 54 includes an integrated circuit 56 and peripheral contacts 58. A contact pad 60 of conductive material is applied to the substrate surface 24. Placement of the die 44 on the contact pad 60 establishes electrical contact between the die contacts 58 and the substrate pad 60. The die 44 is held in place on substrate surface 24 by suitable means such as adhesive.

The coiled ends 62, 64 of the antenna segments 40, 42 are attached to the substrate pad 60 by suitable means such as adhesive or solder, whereby electrically connecting the antenna through pad 60 to the IC on the die 44. The cover 37 may be affixed as shown in FIG. 3C by adhesive or other means to complete the assembly as shown in FIG. 3D. The coiled antenna segments 40 are directly coupled at the coiled inner ends 62, 64 to the pad 60 and extend free of the sealed compartment formed by the cover 37 and the substrate 22. Placement of the completed assembly into a tire is achieved by affixing the substrate to a tire mounting surface such as the inner liner by suitable means such as adhesive. The antenna segments 40, 42 rest against the tire mounting surface but preferably extend adhesive free from containment of cover 37 and substrate 22. Accordingly, as with the embodiment of FIGS. 2A-D, the RFID tag assembly 16 is sealed, durable, and capable of withstanding the use-induced stresses of the tire. FIG. 3E shows a tubular casing surrounding the RFID package of FIG. 3C as an alternative packaging configuration. The tubular casing 66 provides a protective enclosure of the RFID electronics package during shipment, handling, installation, and tire use.

FIGS. 4A-D show another alternative embodiment of an RFID Assembly 68. The cover 70 is removed (or an already opened package is used) in FIG. 4B to illustrate placement of the die 54 on the support surface 24 of the substrate 22. The conductive pad 60 is secured to the surface 24 as with the embodiment of FIGS. 3A-D discussed previously. A series of depending support legs 72 are secured to opposite sides of the substrate 22 and each leg 72 includes a bend 71 transitioning into a support foot 73 that is generally coplanar with the underside of the substrate 22. A medial portion of each side of the substrate is support leg-free to allow access to the contact pad 60 by the coiled ends 62, 64 of antenna segments 40, 42 as will be appreciated in FIGS. 4C and 4D. The cover 70 is attached over the substrate 22 and sealed by suitable means such as adhesive compound. The completed assembly 16 of FIG. 4D is attached to a tire surface such as the inner liner by adhesive applied to the underside of the substrate 22 as well as the undersides of the feet 73 of the support legs. The resultant tag 16 is durable and the legs 72 aid in attachment of the unit 16 to the tire by increased anchoring provided by adhesive connection of the feet 73 to the tire surface.

Figure 5C:
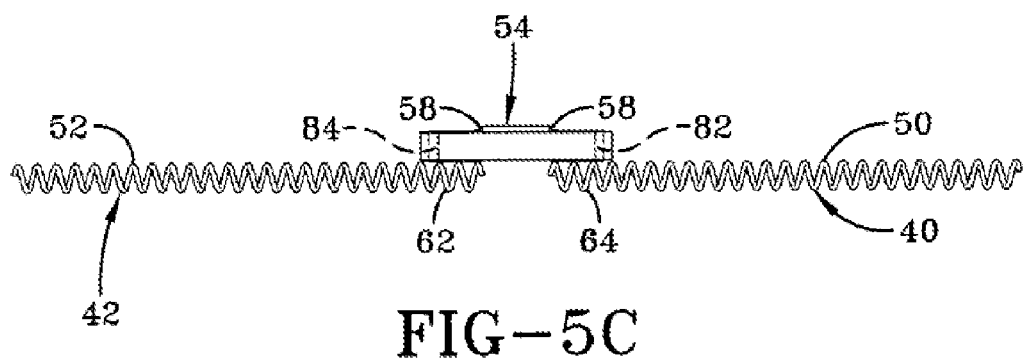
Figure 5D:
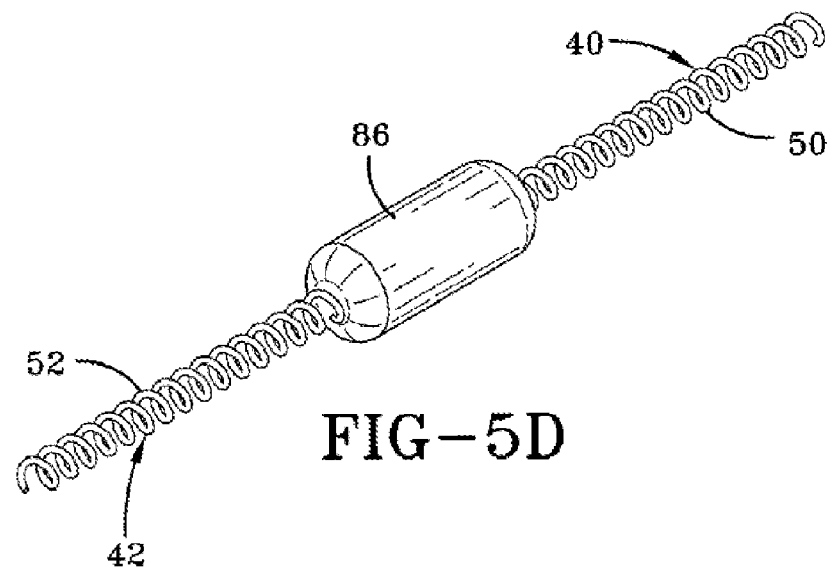

FIGS. 5A-C show an alternative configuration for the RFID tag assembly 16. Contact pads 74, 76, 78, 80 are secured to top and bottom surfaces of the substrate 22. An IC die 56 is mounted to a top surface of the substrate and includes contacts 58 along opposite die sides. Alternately, the contacts could also be inductively coupled using a ferrous material. Plated through holes 82 extend through the substrate 22 and are positioned to electrically connect the contact pads 74, 78 on one substrate side with the pads 76, 80 on the opposite substrate side (not shown). The coiled ends 64, 66 of the antenna segments 40, 42 are secured to the pads 76, 80 and electrically connect with the die contacts 58 through the plated through holes 82, 84. Free segments 50, 52 of the antenna segments 40, 42, respectively, project free from the substrate 22 as with the embodiments shown and discussed previously. It will be appreciated that the assembly of FIG. 5C may be incorporated into a tire by adhesive attachment of the substrate 22 to a tire surface as described previously. Preferably, however, the electronic die and substrate with the ends 64, 66 of the antenna segments 40, 42 will be encased within a tubular casing 86 as shown in FIG. 5D to better protect the electronic tag during shipping, attachment to a tire, and tire use.

Figure 6A:
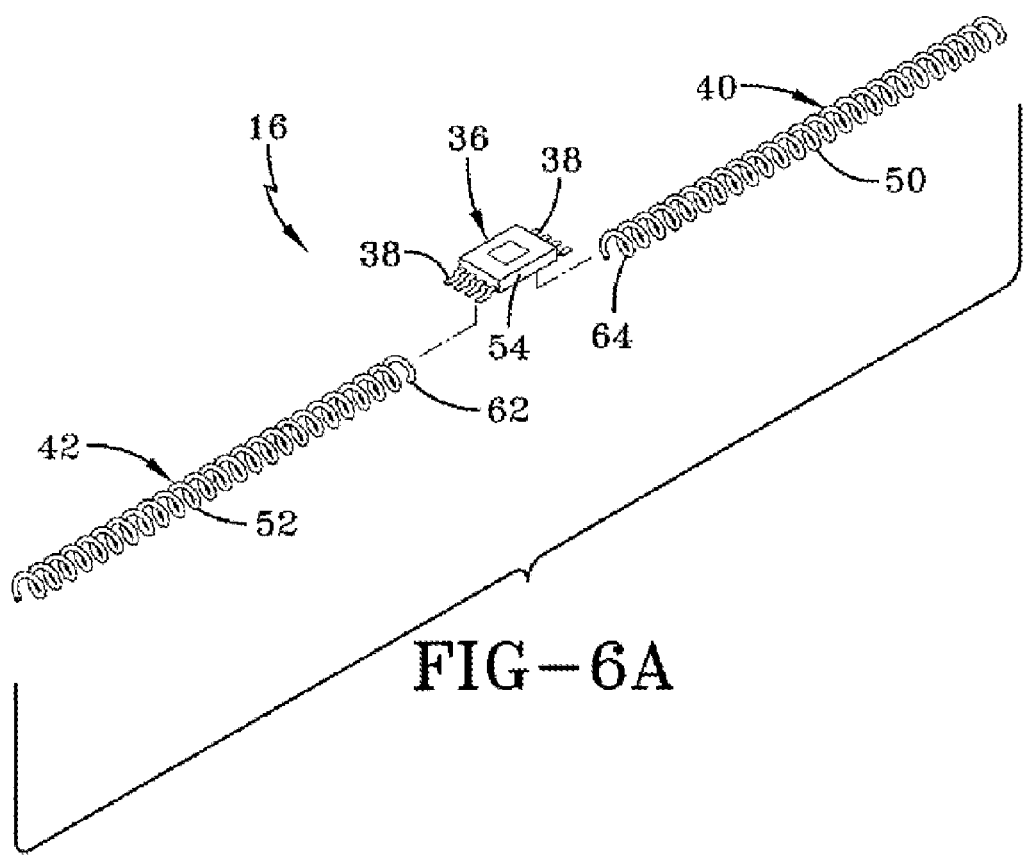
FIGS. 6A, 6B, 6C, and 6D show alternative connection schemes between a tag and antenna elements.
Figure 6B:
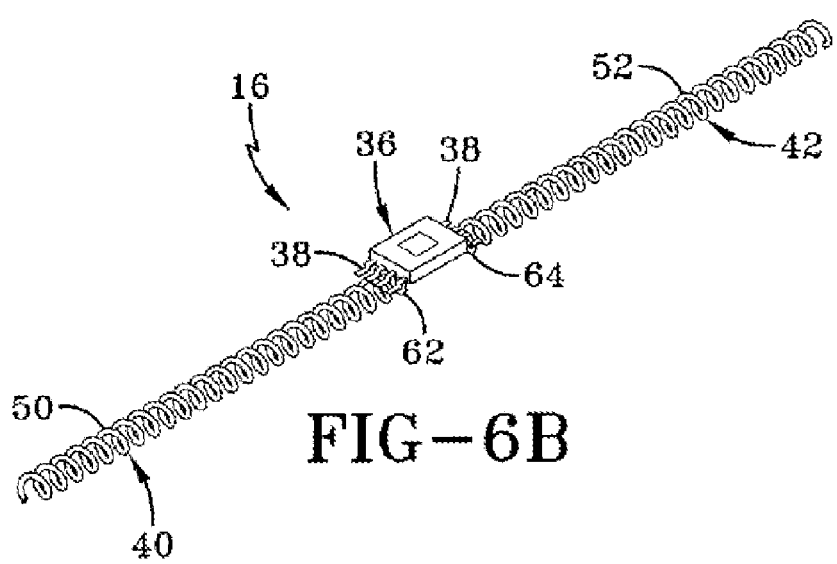
Figure 6C:
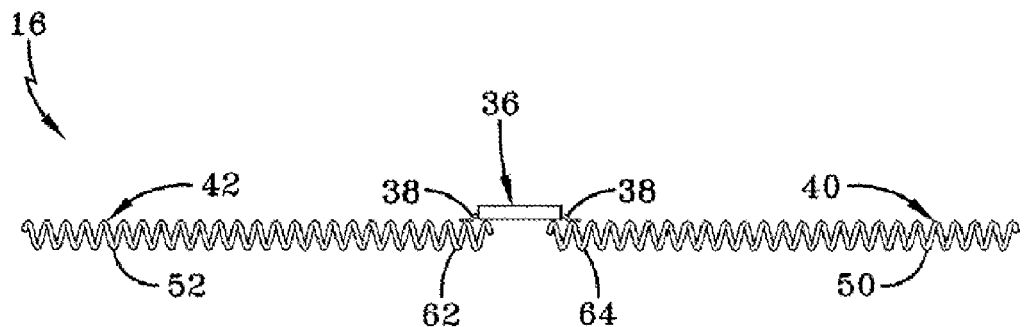

FIGS. 6A-6D show other alternative embodiments for the RFID tag assembly 16. In FIG. 6A, the RFID package 36 provides edge contacts that are directly coupled to the ends 62, 64 of the antenna segments 40, 42 by suitable means such as solder. The electronics package 36 may then be encased into a tubular package as shown in FIG. 6B. FIG. 6C shows a die configured having dependent contact legs 38 that are attached directly to the coiled antenna segment ends 62, 64.

Figure 6D:
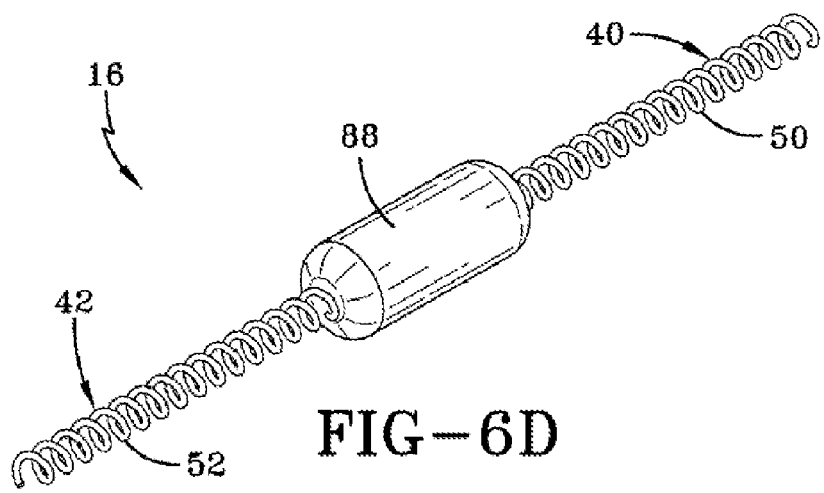

FIG. 6D shows encasement of the package of FIG. 5C within a tubular casing 88 for added protection and durability as described previously.

From the foregoing, it will be understood that the subject invention satisfies a need for a UHF RFID tag package that is readily incorporated into a tire; provides the requisite durability to maintain antenna to circuit board integrity during the life of the tire and the service life of the tag. The tag assemblies described readily integrate 0.8 and 1.4 pitch coil antennas directly into a plastic IC package either by opening the IC package and keeping the die intact (FIGS. 2A-2D) or by opening the IC package and removing the die (FIGS. 3A-D). In the first approach, the connections made to the leads are made directly to the antenna instead. The possibility of failure of a lead to IC connection is thereby eliminated. A portion (inward coiled end) of the antenna is embedded in the IC when it is re-sealed to further secure the integrity of the antenna to IC attachment.

In the latter approach of FIGS. 3A-3D, the die is replaced on the carrier substrate and the die connections are made to the antennas. Likewise, inward coiled ends of the antenna segments are embedded in the IC when it is re-sealed.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire and RFID tag assembly comprising:
   a tire having a tag mounting surface;
   a tag package mounted to the tag mounting surface and comprising:
   a carrier substrate having a die receiving surface and at least one interconnection tab mounted to the die receiving surface and at least partially composed of electrically conductive material;
   an antenna having an end connected to the interconnection tab on the die receiving surface and an antenna segment extending outward from the carrier substrate;
   an integrated circuit die mounted to the die receiving surface and having at least one electrical contact in contacting engagement with the interconnection tab;
   wherein the antenna is a dipole antenna comprising first and second antenna members having inward ends connected to respective first and second interconnection tabs on the die receiving surface and outer antenna segments extending outward from the carrier substrate, and the integrated circuit die having electrical contact means in contacting engagement with the first and second interconnection tabs.

2. The assembly of claim 1, further comprising a cap member substantially enclosing the integrated circuit die, the carrier substrate, and the inward ends of the first and second antenna members; the outer antenna segments of the first and second antenna members extending outward from the cap member.

3. The assembly of claim 1, wherein the antenna segments have a substantially coiled elongate configuration and the outer antenna segments are affixed against respective portions of the tire tag mounting surface.

4. A tire and RFID tag assembly comprising:

a tire having a tag mounting surface;

a tag package mounted to the tag mounting surface and comprising:

a carrier substrate having a die receiving surface and at least one interconnection tab mounted to the die receiving surface and at least partially composed of electrically conductive material;

an antenna having an end connected to the interconnection tab on the die receiving surface and an antenna segment extending outward from the carrier substrate;

an integrated circuit die mounted to the die receiving surface and having at least one electrical contact in contacting engagement with the interconnection tab;

wherein the integrated circuit die includes at least one integrated circuit device;

wherein the integrated circuit die is operably mounted substantially flat against the die receiving surface and the electrical contact of the integrated circuit die is operably positioned substantially flat against the interconnection tab; and wherein the antenna is a dipole antenna comprising first and second antenna members having inward ends connected to respective first and second interconnection tabs on the die receiving surface and outer antenna segments extending outward from the carrier substrate, and the integrated circuit die having at least first and second electrical contacts in contacting engagement with the first and second interconnection tabs.

5. The assembly of claim 4, wherein the outer antenna segments have a substantially coiled configuration and are positioned against respective portions of the tire tag mounting surface.

6. The assembly of claim 5, wherein the integrated circuit die is operably mounted substantially flat against the die receiving surface and the first and second electrical contacts of the integrated circuit die are operably positioned substantially flat against the interconnection tab.

7. The assembly of claim 6, further comprising a substantially cylindrical encapsulation body surrounding the carrier substrate, the inward ends of the first and second antenna segments and the integrated circuit die.

8. The assembly of claim 5, wherein the integrated circuit die further including at least one support leg member extending from the die mounting surface of the carrier substrate operably positioned to support the carrier substrate and the integrated circuit die on the tag mounting surface of the tire.

* * * * *